United States Patent [19]

Takanashi et al.

[11] Patent Number: 4,558,328
[45] Date of Patent: Dec. 10, 1985

[54] HIGH RESOLUTION THERMAL INK TRANSFER PRINTER

[75] Inventors: Itsuo Takanashi; Hideshi Tanaka; Hisanori Tsumiyama, all of Yokohama; Yoshio Mizuno, Kamakura; Terumi Ohara, Yokohama; Shigeru Kato, Tokyo; Toshinori Takahasi, Kawasaki; Tsutomu Kiuchi, Yokohama, all of Japan

[73] Assignee: Victor Company of Japan, Ltd., Japan

[21] Appl. No.: 545,298

[22] Filed: Oct. 25, 1983

[30] Foreign Application Priority Data

Oct. 26, 1982 [JP] Japan ................................ 57-186721
Dec. 17, 1982 [JP] Japan ................................ 57-220134

[51] Int. Cl.$^4$ ............................................ G01D 15/10
[52] U.S. Cl. ................................ 346/76 PH; 358/298; 400/120
[58] Field of Search .................... 346/76 PH; 358/296, 358/298; 400/120

[56] References Cited

U.S. PATENT DOCUMENTS

| | | | |
|---|---|---|---|
| 3,777,116 | 12/1973 | Brescia | 346/76 PH X |
| 4,268,838 | 5/1981 | Nakano | 346/76 PH |
| 4,284,876 | 8/1981 | Ishibashi | 346/76 PH X |
| 4,287,521 | 9/1981 | Hakoyama | 346/76 PH X |
| 4,399,749 | 8/1983 | Arai | 346/76 PH X |
| 4,415,913 | 11/1983 | Diddens | 358/298 X |
| 4,443,121 | 4/1984 | Arai | 346/76 PH X |

FOREIGN PATENT DOCUMENTS

| | | |
|---|---|---|
| 0028334 | 5/1981 | European Pat. Off. |
| 2406824 | 8/1974 | Fed. Rep. of Germany |
| 2918710 | 1/1980 | Fed. Rep. of Germany |
| 2070384 | 2/1981 | United Kingdom |
| 2097217 | 2/1982 | United Kingdom |
| 2110036 | 6/1982 | United Kingdom |
| 2114850 | 1/1983 | United Kingdom |
| 2118799 | 3/1983 | United Kingdom |

*Primary Examiner*—Joseph W. Hartary
*Attorney, Agent, or Firm*—Pollock, VandeSande & Priddy

[57] ABSTRACT

A thermal ink transfer printer comprises a thermal print head including a linear array of resistance elements corresponding to picture elements to be printed along a line path on a record medium, and means for continuously and relatively moving the head and the mediums to each other at a substantially constant speed in a direction perpendicular to the line path and providing a pressure contact between the head and transfer medium and between the mediums. A head control circuit is provided for generating currents in the resistance elements respectively for durations each proportional to the tone value of each of the picture elements.

7 Claims, 7 Drawing Figures

PAPER MOTION

HIGH RESOLUTION THERMAL INK TRANSFER PRINTER

BACKGROUND OF THE INVENTION

The present invention relates to a printer of the type in which thermally fusable ink is transferred from a transfer sheet to a record medium upon pressure contact with a thermal print head.

Conventional printers employ dither matrix technique whereby the tone value of each picture element is resolved into 16 discrete values and represented by a corresponding number of dots located in specified positions of a matrix of 4 rows and 4 columns. One disadvantage of this technique is the difficulty in increasing the number of resolution steps. This results in an image having no subtle differences in shades and nuances of the original.

SUMMARY OF THE INVENTION

The present invention provides a high resolution printer of the thermal ink transfer type.

The printer of the invention comprises a thermal print head including a linear array of resistance elements corresponding to picture elements to be printed along a line path on a record medium, and means for continuously and relatively moving the head and the mediums to each other at a substantially constant speed in a direction perpendicular to the line path and providing a pressure contact between the print head and transfer medium and between the mediums. A head control circuit is provided for generating currents in the resistance elements respectively for durations each proportional to the tone value of each of the picture elements.

In a preferred embodiment, the control circuit is adapted to receive a video signal and includes a memory having a matrix of storage locations. Means are provided whereby the video signal is sampled and converted to digital samples and sequentially stored in the memory in the direction of rows and sequentially read out of the memory in the direction of rows. The reading operation is repeated on each row a predetermined number of times and successively shifted to the next in the direction of columns. A variable reference is generated in response to each of said rows being read each time for comparison with the digital samples to generate binary digits which are stored for a predetermined period in a shift register. The stored binary digits are used to heat resistance elements corresponding in position to the binary digits.

BRIEF DESCRIPTION OF THE DRAWINGS

The present invention will be described in further detail with reference to the accompanying drawings, in which.

DETAILED DESCRIPTION

Figure 1:
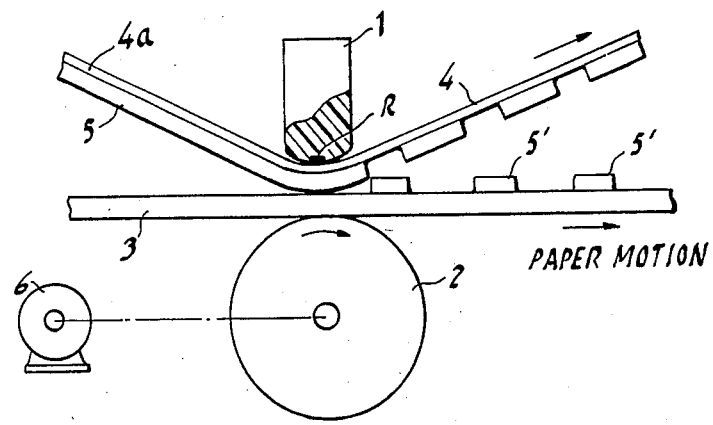
FIG. 1 is an illustration of a portion of a thermal ink transfer printer.

Referring more particularly to FIG. 1, a portion of an ink transfer printer of the invention is illustrated. A thermal print head 1 extends parallel with the rotary axis of a platen 2 which is driven at a constant speed by a DC or AC motor 6, whereby a recording sheet 3 and a thermal ink transfer sheet 4 are advanced. The platen 2 is entirely covered with a layer of rubber to ensure continuous paper advancement. The transfer sheet 4 has a polyester base 4a and a film of thermally fusable ink 5 deposited on the base. A portion of the ink film 5 is brought into pressure contact with the writing surface of record medium 3 where the print head 1 contacts the base 4a of transfer sheet against the platen 2. The portions of the ink layer 5 which are heated by the thermal head 1 are fused and attached to the surface of recording sheet 3 as shown at 5'. Recording sheet 3 and transfer sheet 4 are advanced continuously to the right by the rotation of the platen 2.

Figure 2:
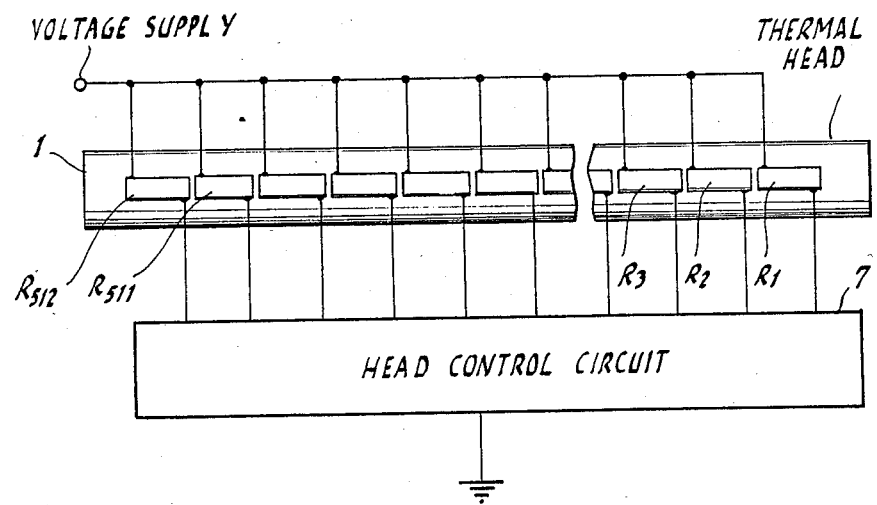
FIG. 2 is an illustration of the thermal print head of FIG. 1.

As illustrated in FIG. 2, the head 1 includes a linear array of resistance elements $R_1$ through $R_{512}$ to produce an image of 512 picture elements in a direction transverse to the direction of paper motion. Each resistance element is in the shape of a rectangle extending in the longitudinal direction of the head 1. The resistance element is connected at one end to a common voltage supply and at the other end to an associated conductor of a head control circuit 7 which selectively applies a ground potential to the individual conductors.

Figure 3:
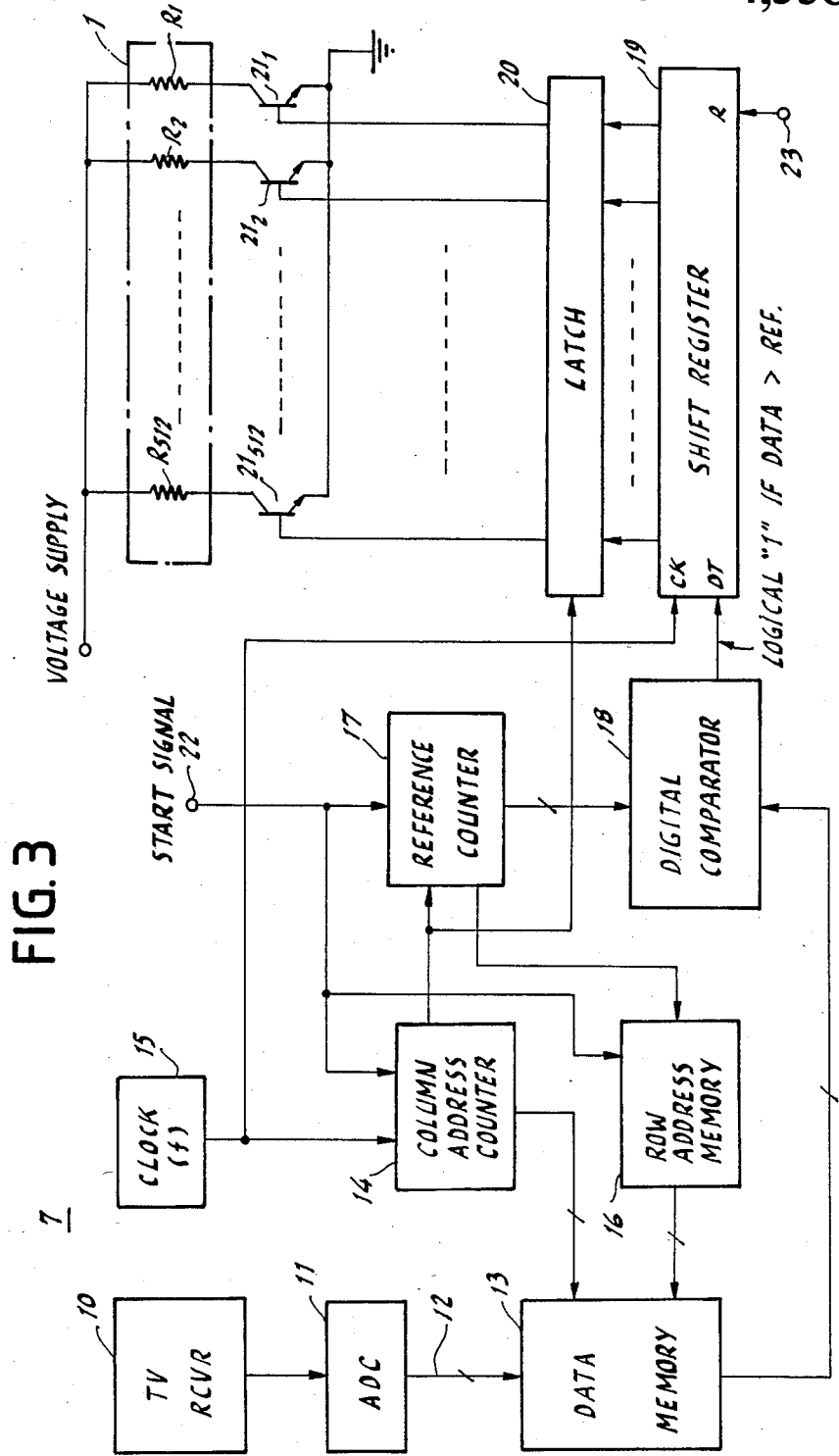
FIG. 3 is a block diagram of a first preferred embodiment of the head control circuit of FIG. 2.

In FIG. 3, a first preferred embodiment of the head control circuit 7 is shown. A signal source 10, typically a television receiver or a video tape recorder or the like, supplies an analog television signal to an analog-digital converter 11 where the signal is sampled in response to clock pulses from source 15 and converted to a digital video sample of 6-bit data word, which is applied on parallel bit lines 12 to a data memory 13. The data memory 13 comprises a random access memory having a matrix of cell locations arranged in a pattern of 512 rows by 512 columns. The digital samples of each television line scan are sequentially written into the memory 13 in the direction of rows to store a complete picture frame.

After the complete picture frame has been stored in the memory 13, 512 digital samples are sequentially read from each row in response to a 9-bit address word generated by a 9-bit column address counter 14 in response to the clock pulse. As will be described, the digital samples of each row are repeatedly read out 64 times for comparison with a digital reference value to determine the tone value of the original picture element whereupon the reading operation is shifted to the next row in response to a 9-bit row address code supplied from a 9-bit row address counter 16.

When 512 clock pulses have been counted the column address counter 24 supplies a carry or "full count" signal to a 6-bit reference counter 17 to increment its count from the initial value "000000" to the maximum of "111111" in response to each readout of 512 video samples. This reference counter can be considered as a digital sawtooth generator since its output follows the waveform of a sawtooth stepwise. This time-varying 6-bit digital reference is supplied to a digital comparator 18 for comparison with the 6-bit data word read out of memory 13. The comparator 18 generates a logical one output if the digital sample has a tone value greater than the reference value and generates a logical zero output if the tone value is equal to or smaller than the reference value. When the maximum reference value "111111" is reached, the reference counter 17 applies a full-count signal to the row address counter 16 to shift the readout operation to the next row. The logical ones and zeros from the comparator 18 are clocked into the data input terminal of a shift register 19 having 512 bit positions.

It will be appreciated therefore that the shift register 19 is loaded with a random sequence of 512 binary 1's and 0's depending on the relative values of the data words retrieved from the 512 cell locations of a given row to an instantaneous value of the digital reference. The binary data stored in the shift register 19 are transferred through a latch 20 to the bases of transistors $21_1$ through $21_{512}$, respectively, in response to the carry signal from the column address counter 14 which is also supplied to the reference counter 17. The transistors 21 have their emitters coupled to ground and their collectors coupled to resistance elements $R_1$ to $R_{512}$ respectively. Those transistors which are supplied with binary 1's from the latch 20 are gated into conduction to generate currents in the associated resistance elements.

Figure 5:
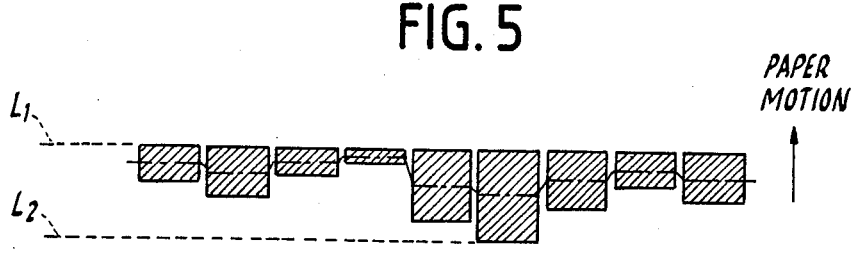
FIG. 5 is an illustration of a line print image according to the first embodiment.

The reading operation begins with the application of a start signal applied to terminals 22 and 23. This start signal resets the counters 14, 17 and shift register 19 to clear any stored contents. The column address counter 14 is incremented by the clock source 15 to address the data memory 13 to read out a series of 512 digital samples in succession out of the No. 1 row into the digital comparator 18. The same digital samples are read out 64 times in response to the clock pulse. In synchronism with these reading operations the reference counter 17 is incremented from the minimum value to the maximum value. The output of the digital comparator 18 is 64 series of 512 binary 1's and 0's, with each series being applied to the thermal head 1 in response to each count of 512 clock pulses. The ink layer 5 is fused in positions corresponding to the heated resistance elements, the fused portions of ink being transferred to the recording sheet 3 as described above. More specifically, a series of rectangles is produced in a direction perpendicular to the direction of advancement of sheet 3 for each of 64 iterative reading operations. With a continued advancement of recording sheet 3 and transfer sheet 4, 64 series of rectangles are recorded along a path defined between dashed lines $L_1$ and $L_2$ as shown at FIG. 5, representing an image of a line scan. It will be seen that the length of each rectangle as measured in the longitudinal direction of the paper 3 varies depending on the density of the original picture element. The image density can follow the original tone value as faithfully as possible by providing as many gradation steps as desired. This is achieved simply by increasing the number of quantum steps of the analog-digital converter 11 and correspondingly increasing the number of bits of reference counter 17 and digital comparator 18.

Although desired halftone can be obtained, the image thus recorded has a series of rectangles whose center lines are not centered on a straight line as seen from FIG. 5.

Figure 4:
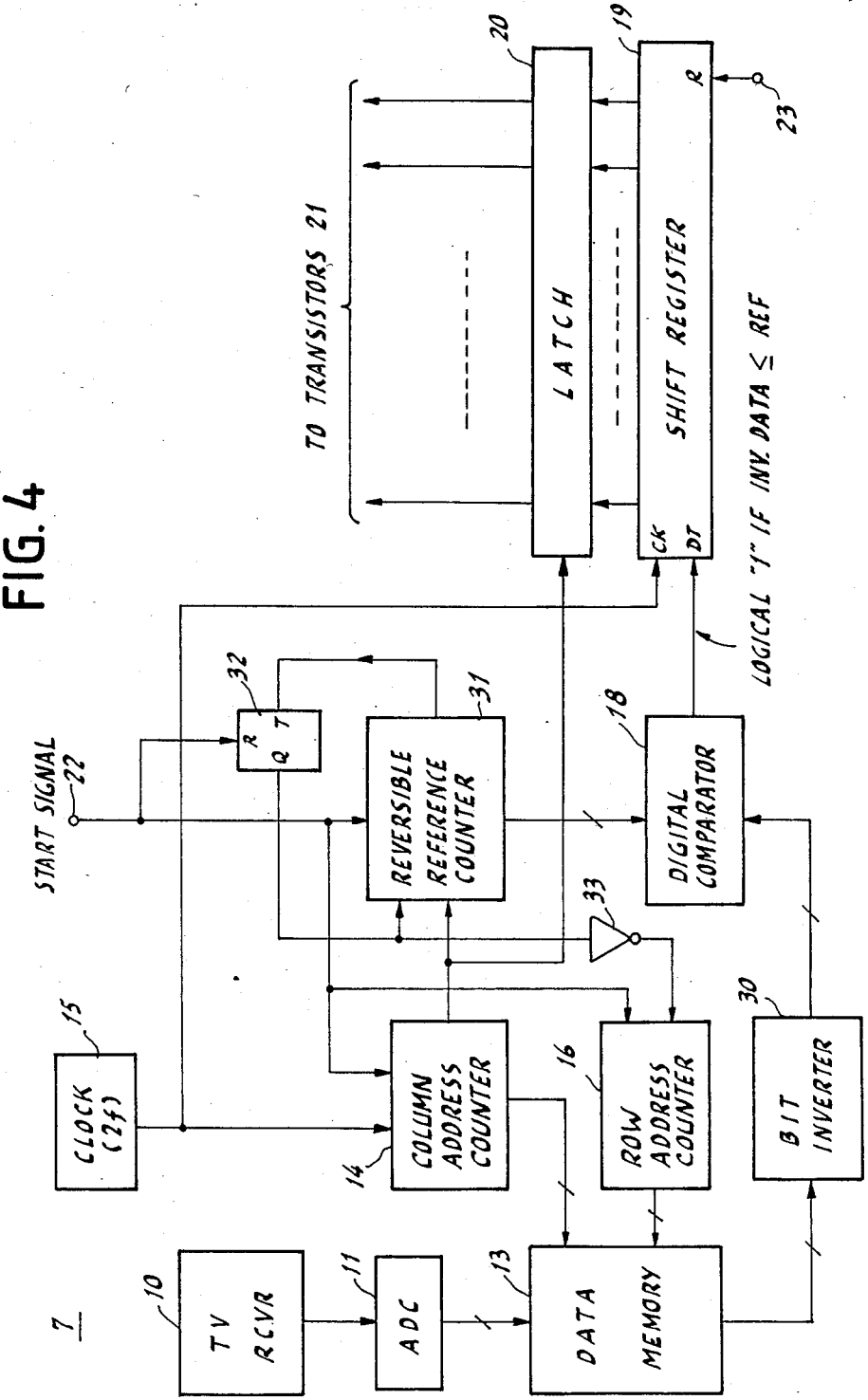
FIG. 4 is a block diagram of a second preferred embodiment of the control circuit.

The invention provides a further embodiment in FIG. 4 in which the picture elements are centered on a straight line. This embodiment differs from the previous embodiment in that it includes a bit inverter 30 interposed between the data memory 13 and the digital comparator 18 and a circuit including a reversible reference counter 31 which replaces the unidirectional counter 17 of the previous embodiment, a T-flip-flop 32 and an inverter 33. A further difference resides in the fact that the frequency of the clock pulses is twice the clock frequency of the previous embodiment.

The provision of the bit inverter 30 is to invert the binary state of the 6-bit digital sample so that the output digital sample of inverter 30 is a complement of the input digital sample. The bit inverter 30 may comprise a set of six inverters respectively connected in the bit lines and a corresponding number of AND gates arranged to be enabled in response to a gating pulse, which may be obtained from the clock source 15, to pass the inverted data bits to the comparator 18. This comparator 18 differs in function from the previous embodiment in that it provides a logical one output if the complementary digital value is equal to or less than the instantaneous value of the reference and generates a logical zero output if the complementary value is greater than the instantaneous reference value.

The reversible counter 31 upcounts the carry signal from the column address counter 14 generating an increasing value of digital reference from "000000" to "111111" during the time the column address counter 14 addresses the same information in the data memory 64 times for each row. During upcount operation the inverted digital samples are compared with the increasing reference words. Upon full count, the reversible counter 31 applies a carry signal to the T input of flip-flop 32. This flip-flop, which has been reset by a start signal on terminal 22, switches to a logical one state at the Q output in response to the carry signal from the counter 31, so that the latter begins downcounting to generate a decreasing value of digital reference from "111111" to "000000". The logical one output of the flip-flop 32 is inverted to a logical zero by inverter 33. Consequently, the output of inverter 33 switches to a logical one at the termination of the downcount operation and the row address counter 16 does not shift the reading operation to the next until the readout operation is further repeated 64 times during the downcount operation to allow the inverted digital samples to be compared with the decreasing reference value.

Figure 6:
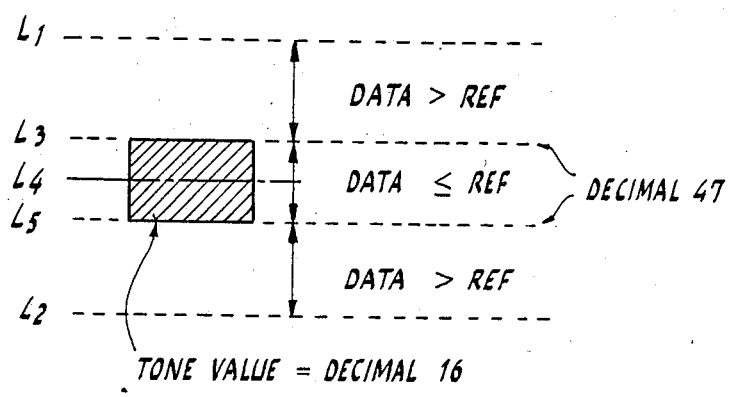
FIG. 6 is an explanatory illustration associated with the second embodiment.

Since the digital comparator 18 of the present embodiment issues a logical one output if the complementary digital value is equal to or smaller than the reference value, a digital sample having a lower tone value produces logical zeros during upcount for a period longer than the period in which a digital sample having a higher tone value would produce logical zeros and produces logical ones for a period shorter than the period in which the higher tone-value would produce logical ones. For example, a digital sample having a tone value of decimal 16 has a complementary value of decimal 47 ($=63-16$). The digital comparator 18 produces logical zeros until the increasing reference reaches the decimal 47 leaving the space between lines $L_1$ and $L_3$ blank as shown in FIG. 6 and thereafter produces logical ones until the increasing reference reaches the maximum value (=decimal 63), thus producing black in the space between line $L_3$ and the center line $L_4$. During downcount, the comparator 18 continues producing logical ones until the decreasing reference reaches the decimal 47, producing black in the space between the center line $L_4$ and a line $L_5$. Thereafter it produces logical zeros until the decreasing reference reaches the minimum value, thus leaving a portion between lines $L_5$ and $L_2$ blank.

Figure 7:
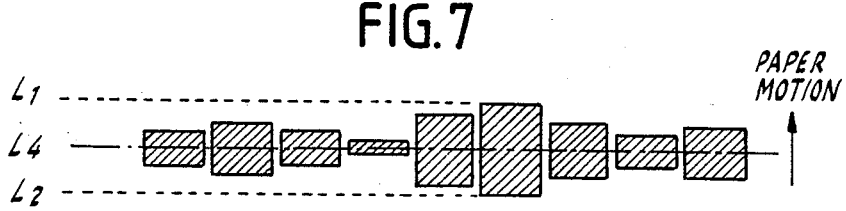
FIG. 7 is an illustration of a line print image according to the second embodiment.

It is seen that a high-tone value digital sample produces a black rectangle having a leading edge which is earlier than the leading edge of a rectangle resulting from a low-tone value digital sample and that rectangles of different sizes align themselves on the center line $L_4$ as illustrated in FIG. 7.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A printer for providing a print on a record medium by transfer of thermally fusable ink from a transfer medium to said record medium, comprising a thermal print head including a linear array of resistance elements corresponding to picture elements to be printed along a line path on said record medium, means for continuously and relatively moving said head and both of said mediums to each other at a substantially constant speed in a direction perpendicular to said line path and providing a pressure contact between said head and transfer medium and between said transfer and record mediums, and head control means for generating a current of constant intensity in each of said resistance elements for a duration proportional to a tone value of each of said picture elements.

2. A printer as claimed in claim 1, wherein said control means is adapted to receive an analog image signal, said control means comprising:
   a memory having a matrix of storage locations in a pattern of rows and columns;
   means for converting said image signal to digital image samples and sequentially writing said digital samples in said storage locations in the direction of rows;
   means for sequentially reading said digital samples out of a given row and repeating the sequential readout a predetermined number of times and successively shifting the row to be read to the next in the direction of columns;
   means for generating a reference variable in response to each of said rows being read each time;
   means for comparing said digital samples read out of said memory with an instantaneous value of said reference to generate binary digits;
   a shift register for storing said binary digits for a predetermined period; and
   means for generating currents in said resistance elements corresponding in position to the binary digits in said shift register.

3. A printer as claimed in claim 2, wherein said reading means comprises:
   a clock source for generating clock pulses;
   a column address counter for counting the clock pulse and sequentially addressing the columns of said memory in response to said clock pulses; and
   a row address counter for sequentially addressing the rows of said memory, wherein said reference generating means comprises a counter for counting a full count of said column address counter and generating said reference in the form of a digital word, said row address counter shifting the addressed row to the next in response to a full count of said reference generating counter.

4. A printer as claimed in claim 1, wherein said head control means includes means for controlling said durations so that each duration has a midpoint which occurs in coincidence with the midpoints of other durations, whereby the picture elements printed on said record medium are centered on a straight line.

5. A printer as claimed in claim 4, wherein said head control means is adapted to receive an analog image signal, said control means comprising:
   a memory having a matrix of storage locations in a pattern of rows and columns;
   means for converting said image signal to digital image samples and sequentially writing said digital samples in said storage locations in the direction of rows;
   means for sequentially reading said digital samples out of a given row and repeating the sequential readout a predetermined number of times and successively shifting the row to be read to the next in the direction of columns;
   means for inverting the binary state of said digital sample so that the inverted digital sample has a tone value complementary to the tone value of the digital sample prior to the inversion;
   means for generating an incremental reference varying discretely from a minimum value to a maximum value in response to each of said rows being read each time and successively generating a decremental reference varying discretely from the maximum value to the minimum value in response to each of said rows being read each time;
   means for comparing said inverted digital samples with an instantaneous value of said incremental and decremental references to generate binary digits when said inverted digital samples are smaller than said instantaneous value;
   a shift register for storing said binary signals; and
   means for generating currents in said resistance elements corresponding in position to the binary digits in said shift register.

6. A printer as claimed in claim 5, wherein said reading means comprises:
   a clock source for generating clock pulses;
   a column address counter for counting the clock pulse and sequentially addressing the columns of said memory in response to said clock pulses; and
   a row address counter for sequentially addressing the rows of said memory, wherein said reference generating means comprises a reversible counter for counting a full count signal from said column address counter and generating said incremental reference in the form of an incremental digital word until a full count is reached therein and generating said decremental reference in the form of a decremental digital word upon the occurrence of the last-mentioned full count until a zero count is reached therein,
   said row address counter shifting the row to be addressed to the next in response to the occurrence of a zero count in said reversible counter.

7. A printer as claimed in claim 1, wherein each of said resistance elements is in the shape of a rectangle extending in the longitudinal direction of the thermal head.

* * * * *